United States Patent [19]
Sato

[11] 3,868,763
[45] Mar. 4, 1975

[54] AUTOMATIC TOOL EXCHANGING APPARATUS

[75] Inventor: Mitsuharu Sato, Numazu, Japan

[73] Assignee: Toshiba Kikai Kabushiki Kaisha, Tokyo-to, Japan

[22] Filed: Dec. 29, 1972

[21] Appl. No.: 319,711

[30] Foreign Application Priority Data
Jan. 7, 1972    Japan.................................. 47-4538

[52] U.S. Cl. ............................................... 29/568
[51] Int. Cl. ............................................ B23q 3/157
[58] Field of Search ........................... 29/568, 26 A

[56] References Cited
UNITED STATES PATENTS

| | | | |
|---|---|---|---|
| 3,466,739 | 9/1969 | Harman ................................ | 29/568 |
| 3,530,570 | 9/1970 | Shotter ................................. | 29/568 |
| 3,587,873 | 6/1971 | Lohneis ............................ | 29/568 X |
| 3,608,188 | 9/1971 | Seidel .................................... | 29/568 |
| 3,691,626 | 9/1972 | Mousseau et al. ..................... | 29/568 |

Primary Examiner—Andrew R. Juhasz
Assistant Examiner—Z. R. Bilinsky
Attorney, Agent, or Firm—Wenderoth, Lind & Ponack

[57] ABSTRACT

In an automatic tool exchanging apparatus for use in combination with a machine tool of the type wherein a tool mounted on the spindle of the machine tool is exchanged with a tool selected from a tool storage magazine, there are provided a plurality of key shaped tool code member, each formed with a tool code corresponding to a given tool, a tool storage magazine including a plurality of tool pots, each adapted to removably receive one tool and one tool code member, means to read the code of a tool code member in a given tool pot for indexing the tool storage magazine to a tool exchanging position, a tool exchanging arm adapted to simultaneously grip a tool mounted on the spindle and a tool in the given tool pot at the tool exchanging position, driving means for the tool exchanging arm for rotating and moving the same toward and away from the tool storage magazine, tool code member exchanging means adapted to receive a tool code member corresponding to a tool presently mounted on the spindle, and means for interlocking the tool code member exchanging means with the tool exchanging arm driving means for replacing the tool code member corresponding to the tool in the given tool pot for the tool code member corresponding to the tool on the spindle.

3 Claims, 7 Drawing Figures

AUTOMATIC TOOL EXCHANGING APPARATUS

BACKGROUND OF THE INVENTION

This invention relates to a machine tool and more particularly to automatic tool exchanging apparatus for use in machine tools.

The following types of tool selecting systems have been used in automatic tool exchanging apparatus for machine tools and are called as machine centers.

1. Pot Coding System

This system is most widely used and constructed such that respective tool holders of a tool storage magazine are assigned with particular pot addresses in the form of discrete numbers or codes for the purpose of selecting a particular tool by making access to the pot address thereof.

2. Tool Coding System

According to this system a tool code corresponding to the tool number is formed on a portion of each tool. This system permits insertion of a tool in any vacant tool holder or pot of the tool storage magazine. To select a desired tool, the code thereof is read by a known electronic read-out device.

3. Key Coding System

According to this system, instead of forming a tool code which is used to identify a particular tool from other tools on the tool or its holder or pot, the tool code is formed on a key, and a tool and its key is combined. The tool is inserted in any pot of the tool storage magazine. To select a desired tool, a key corresponding to the tool number thereof is inserted into a key hole corresponding to the pot containing the selected key and the tool number of the key is set in an electronic control system as the address of the pot. The pot address is then accessed to select the desired tool.

4. A System without Any selection Capability

Tools are inserted in the pots of the tool storage magazine according to the order of use of the tools, and the tools are selected sequentially.

Comparing the merits and demerits of these four systems, system 4 is suitable for applications where the number of tools is limited and the machining operation is simple but is not suitable for applications where a variety of tools are required to perform complicated machining operations.

The second or tool coding system is advantageous in that it is possible to insert a tool in any vacant tool pot of the tool storage magazine thus permitting ready and fast tool exchange because the tool code attached to the tool is directly read out and discriminated. Moreover, it is possible to directly designate a tool to be used by a program control by classifying the tool codes. However, as it is necessary to attach codes directly on respective tools the construction of the tools is complicated and in certain cases, dependent upon the position of attaching the tool codes, the distance between the tool tip and the tool holder of a machine tool is increased which decreases the cutting capability of the tool.

When compared with the second or the tool coding system, the first or pot coding system is advantageous in that it is not necessary to attach individual codes to the tools thereby obviating the defect described above. As it is necessary to insert the tools in predetermined pots of the tool storage magazine and to designate the pot addresses in a program it is extremely difficult to prepare, rearrange or correct a program which is used for exchanging a number of tools in a prescribed order. Moreover, as it is necessary to insert tools in prescribed pots it takes a relatively long time for exchanging the tools.

Like the second or tool coding system, with the third or key coding system, it is easy to set the tools in the tool storage magazine and in the control program but like the first or pot coding system, with the third or key coding system it is also necessary to search the address to which the tool is to be returned after its use and the sequence control and the tool exchange operation are complicated.

SUMMARY OF THE INVENTION

It is an object of this invention to provide an improved tool changing system which can retain the merits of the tool coding system and the key coding system but can eliminate the demerits of these prior art systems.

Another object of this invention is to provide a new and improved tool exchanging apparatus which can simplify the construction of the tools and the sequence control system therefor.

Another object of this invention is to provide an improved automatic tool exchanging apparatus in which the codes of respective tools and rearrangement of the sequence control can be made readily.

According to this invention, these and further objects can be accomplished by providing automatic tool exchanging apparatus for use in combination with a machine tool of the type wherein a tool mounted on the spindle of the machine tool is exchanged with a tool selected from a tool storage magazine, characterized in that there are provided a plurality of key shaped tool code member, each formed with a tool code corresponding to a given tool, a tool storage magazine including a plurality of tool pots, each adapted to removably receive one tool and one tool code member, means to read the code of a tool code member in a given tool pot for indexing the tool storage magazine to a tool exchanging position, a tool exchanging arm adapted to simultaneously grip a tool mounted on the spindle of the machine tool and a tool in the given tool pot at the tool exchanging position, driving means for the tool exchanging arm for rotating and moving the same toward and away from the tool storage magazine, tool code member exchanging means adapted to receive a tool code member corresponding to a tool presently mounted on the spindle, and means for interlocking the tool code member exchanging means with the tool exchanging arm driving means for replacing the tool code member corresponding to the tool in the given tool pot for the tool code member corresponding to the tool on the spindle.

The apparatus permits the return of the used tool to any tool pot of the tool storage magazine without the necessity of searching the particular address assigned for the tool.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
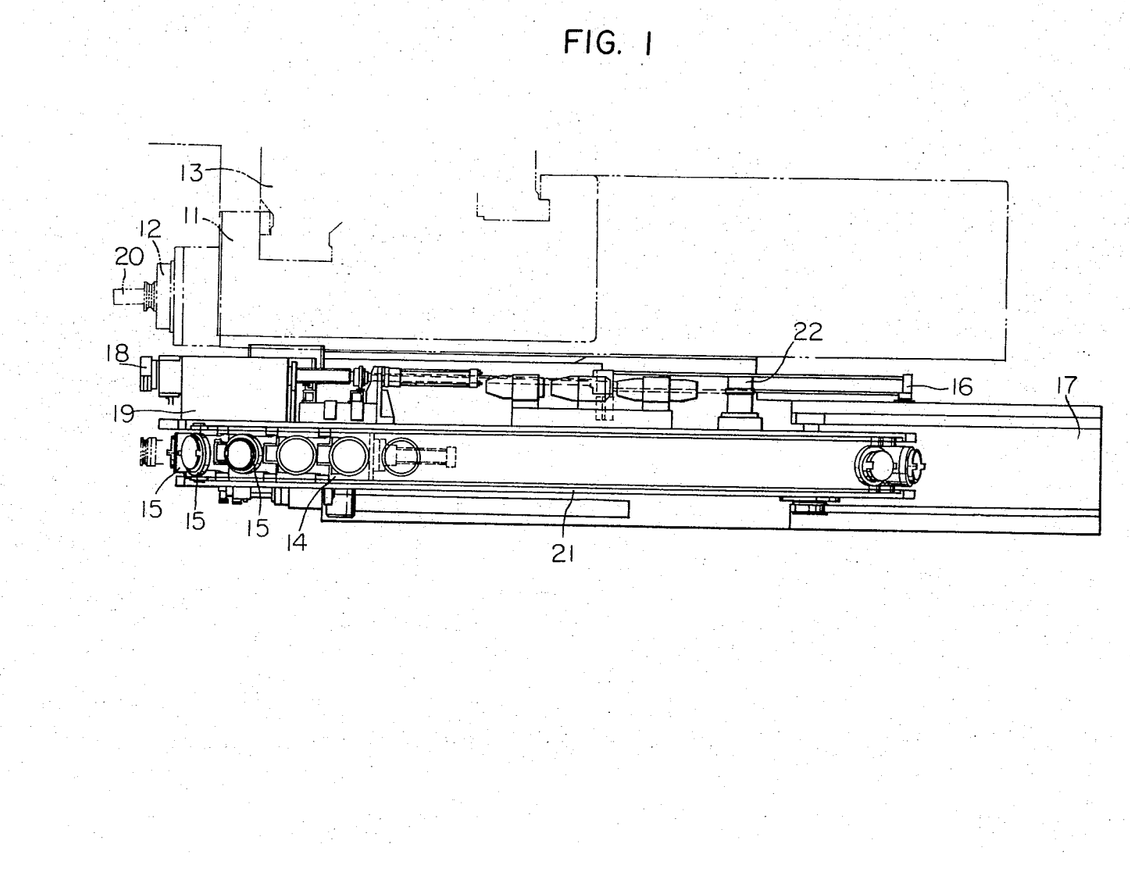
FIG. 1 is a plan view of one embodiment of the automatic tool exchanging apparatus embodying the invention.
Figure 2:
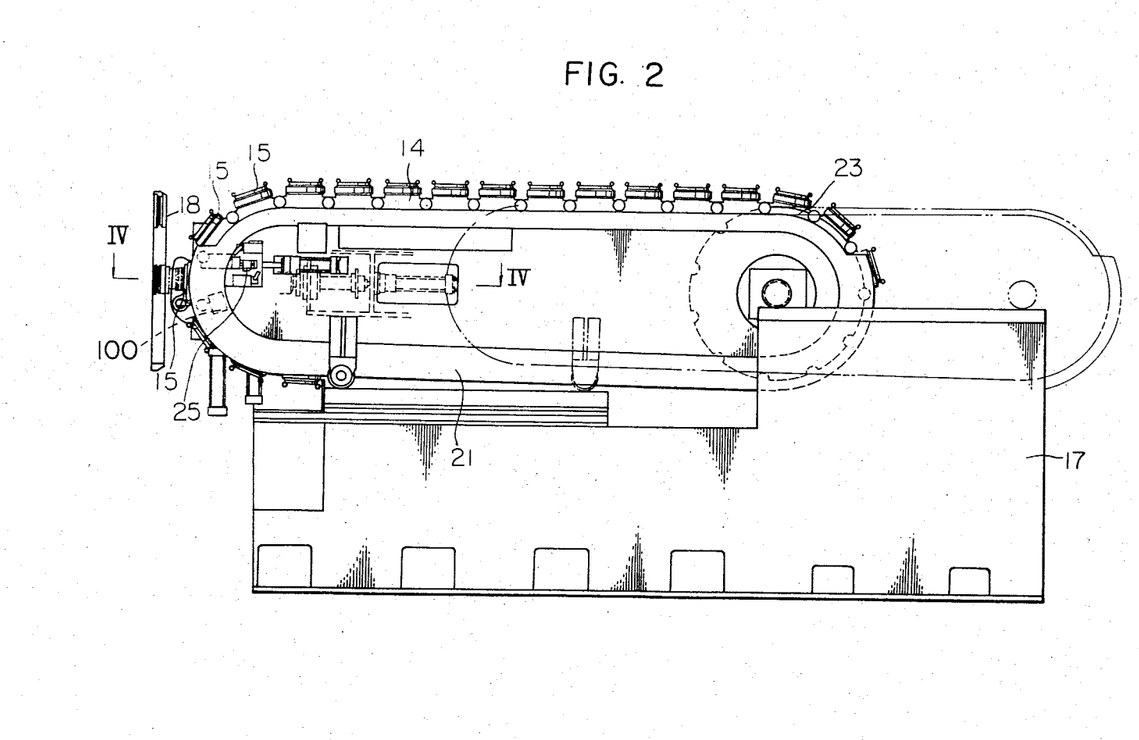
FIG. 2 is a front view of the tool exchanging apparatus shown in FIG. 1.

Referring now to the accompanying drawings, a machine tool with which the novel tool exchanging apparatus is combined comprises a spindle head 11 adapted to rotatably support a spindle 12 on which a tool 20 is removably mounted. The spindle head 11 is supported to be slidable along a guide surface of a column 13 and is moved, to a predetermined position (tool exchanging position) under a tool exchanging command signal. Alongside the spindle head 11 is positioned a tool storage magazine 14 comprising a plurality of tool holders or pots 15 which are connected together in the form of a rotatable endless chain. As shown by solid lines and dot and dash lines in FIG. 2, the tool storage magazine 14 is reciprocated between a tool exchanging position and a retracted position along a guide 17 by means of a piston cylinder assembly 16 (FIG. 1). Further, the tool exchanging apparatus comprises a tool exchanging arm 18 having grips on both ends for holding the tools and is reciprocated and rotated for the purpose of exchanging the tool and a tool exchanging arm driving mechanism 19 which is secured to one side of the tool storage magazine 14 for rotating and reciprocating the tool exchanging arm 18.

Figure 3:
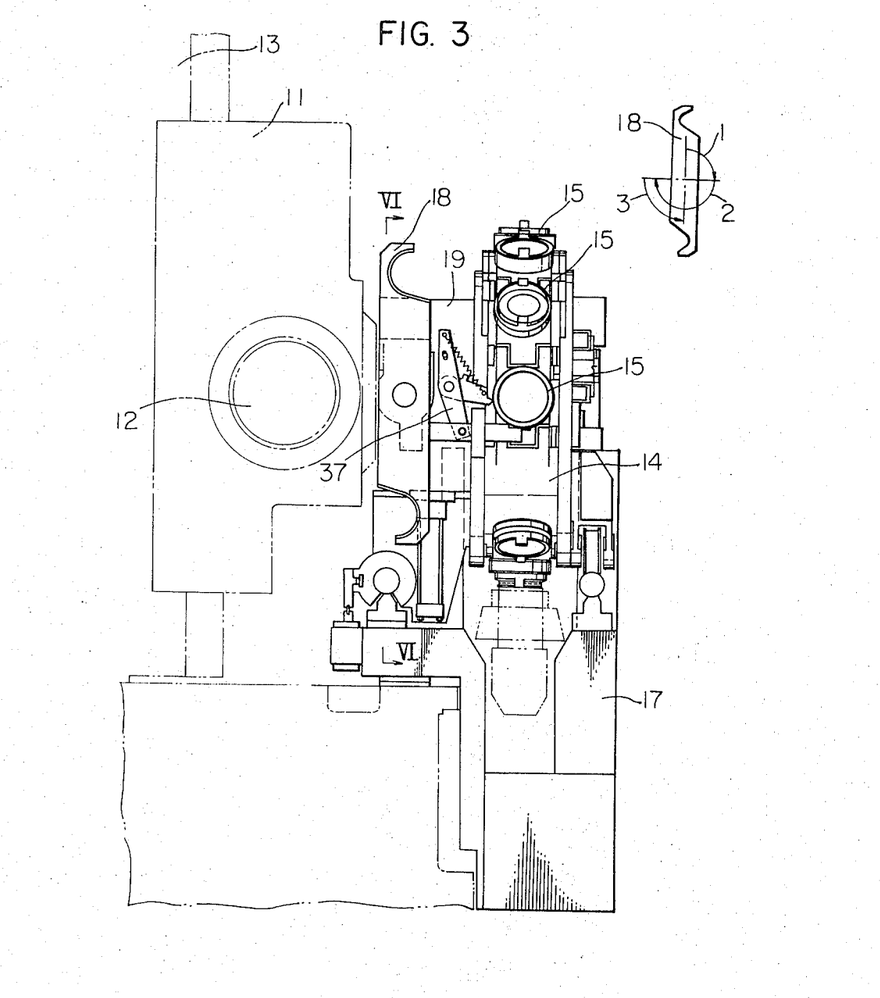
FIG. 3 is a side view thereof.

The tools are exchanged as follows:

In response to a tool exchanging command signal, spindle 11 and a tool pot 15 of the tool storage magazine 14 containing a selected tool 20B are indexed to the tool exchanging position at which the tool exchange is made and the tool exchanging arm 18 is rotated 90° from the initial position shown in FIG. 3 in the clockwise direction as shown by arrow 1 for simultaneously gripping tool 20A on spindle 12 and tool 20B received in the given tool pot 15. Then, the tool exchanging arm 18 which is now gripping tools 20A and 20B is advanced to withdraw them from spindle 12 and tool pot 15. Thereafter, the tool exchanging arm 18 is rotated 180° in the clockwise direction as shown by arrow 2 for causing tools 20A and 20B to face to spindle 12 and tool pot 15, respectively. Then, the tool exchanging arm 18 is retracted to mount tool 20B on spindle 12 and to insert tool 20A in tool pot 15. Thereafter, the tool exchanging arm 18 is rotated 90° in the counterclockwise direction as shown by arrow 3 thus restoring the original state. It should be noted that this is possible only when the upper and lower halves of the tool exchanging arm are constructed to be symmetrical with respect to the axis of rotation and that actually the phase of the tool exchanging arm 18 has been shifted by 180°.

With regard now to the selection of tool 20 and indexing of tool pot 15, during operation of the machine tool the tool storage magazine 14 is held in the waiting or retracted position at which it does not interfere with the cutting operation of the machine tool. When the tool number of a tool to be used next time is designated, the endless chain constituted by interconnecting a number of tool pots 15 is rotated along a guide 21 provided for the tool storage magazine 14 by a sprocket wheel 23 driven by the driving mechanism 22. Each tool pot 15 is provided with a tool code member 24 corresponding to a tool to be received therein as will be described later in more detail. The codes of tool code members 24 of respective tool pots 15 are read and discriminated by a code detector 100 mounted on the tool storage magazine 14 and the read out codes are used to bring a particular tool pot containing a tool 20B corresponding to the designated tool number to the tool exchanging position thereby positioning the particular tool pot 15 to a position which is selected by a positioning device 25 as a correct position.

When the machine tool completes its cutting operation, a tool exchange command signal is generated by the control system. In response to this signal, the tool storage magazine is advanced to the tool exchange position along the guide 17 from the retracted position or waiting position by the operation of the piston cylinder assembly 16.

Figure 4A:
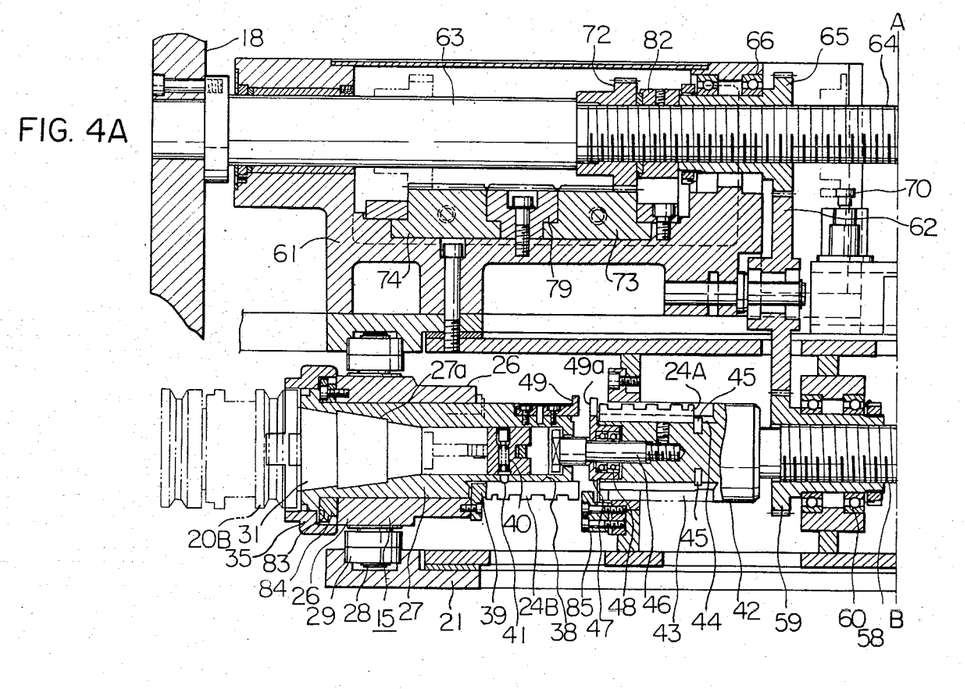
FIG. 4 (divided into two parts 4a and 4b) is a sectional view, taken along a line IV–IV in FIG. 2, showing the construction of the tool exchanging arm driving mechanism and the tool storage magazine.
Figure 4B:
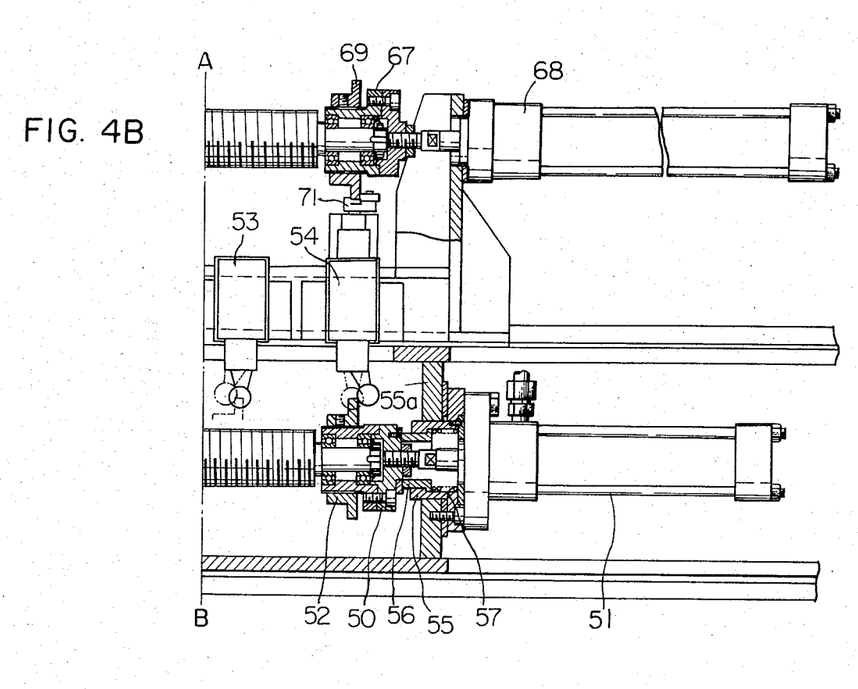
Figure 5:
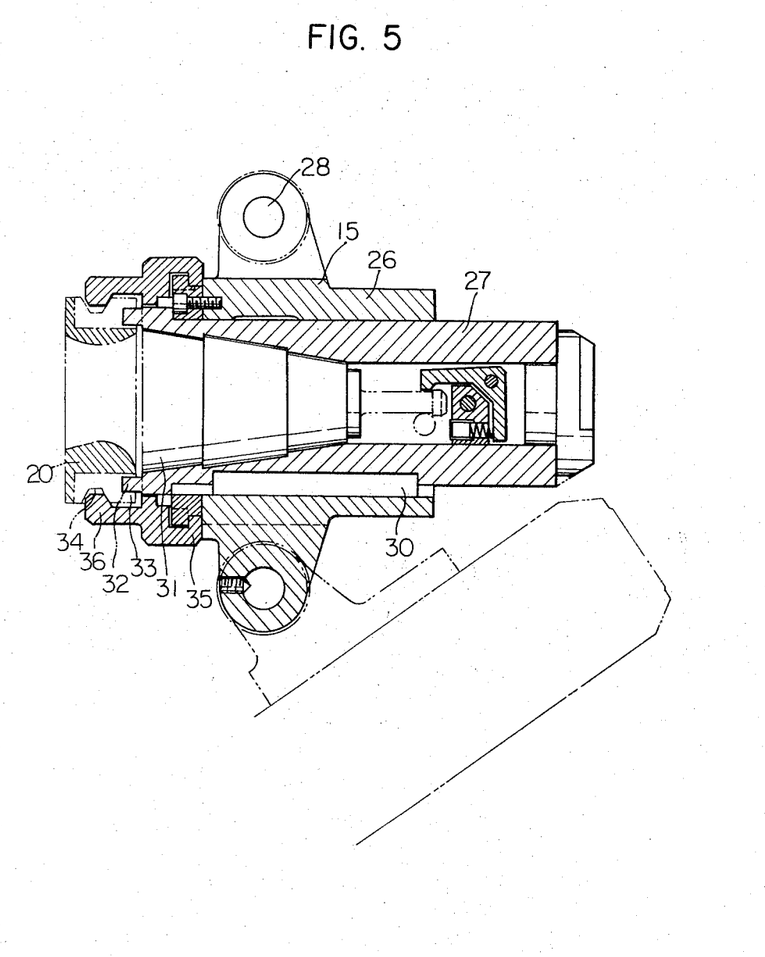
FIG. 5 shows a sectional view of one tool pot of the tool storage magazine.

With reference now to FIGS. 4 and 5, each tool pot 15 comprises a cylindrical housing 26 and a sleeve 27 contained therein. The housing 26 is formed with apertured wings through which connecting pins 28 are inserted to interconnect respective tool pots 15 into an endless chain. Rollers 29 are mounted on the opposite ends of each pin 28 for moving the tool pots along guide 21 of the tool storage magazine. The sleeve 27 is secured to the inner bore of the housing 26 by means of a key 30 so as not to rotate with respect thereto but can slide over a limited stroke in the axial direction. Tool 20 comprises a shank 31 adapted to be fitted in a tapered opening at one end of sleeve 27. The tool 20 is prevented from rotating relative to the sleeve by providing a key 32 at the outer end of the sleeve, the key projecting into a key way 33 of the tool 20. A circumferencial groove 34 is provided for the tool to receive a pair of diametrically opposite pawls 36 of a nose or clamp nut 35 whose axial movement is limited by the housing 26. When the nose nut 35 is rotated a predetermined angle by a rotating device to be described later the pawls 36 are caused to engage groove 34 so as to clamp the tool 20 to the housing 26 with the result that even when the tool 20 is brought to a vertical position by the rotation of the tool storage magazine 14, the tool 20 will not drop. However, it is to be understood that, at the time of tool exchange the nose nut 35 is rotated such that the pawls 36 engage the key way 33 of the tool 20 so as not to interfere with the relative axial movement of the tool 20 and sleeve 27. According to this invention, the rotation of the nose nut 27 is effected automatically by a nose nut rotating device 37 mounted on the front end of tool exchanging arm driving mechanism 19, as shown in FIG. 3.

On the periphery of sleeve 27 is formed an axial dovetail groove 38 to receive a key shaped tool code member 24. In FIG. 4, however, a tool code member 24B corresponding to a tool 20B which is to be used next time is shown as being received in groove 38. The tool code member 24B is held by means of a positioning pin 41 which is urged by a spring 40 with one end of the tool code member 24B urged against a stop member 39 secured to housing 26. A tool code exchanging shaft 42 adapted to exchange the tool code members 24 concurrently with the exchange of tools is contained in the tool storage magazine 14 coaxial with the tool pot 14 in the tool exchanging position. Diametrically opposite dovetail grooves 43 and 44 adapted to receive tool code members 24 are formed on the peripheral surface of shaft 42 at the front end thereof. In the state shown in FIG. 4 dovetail groove 43 which is in the same angular position as dovetail groove 38 of sleeve 27 is vacant, whereas dovetail groove 44 which is 180° spaced apart from dovetail groove 43 contains tool code member 24A corresponding to tool 20A which has been used and is now mounted on spindle 12 of the spindle head 11. Radial positioning keys 45 are driven in dovetail grooves 43 and 44 to limit the longitudinal movement of the tool code members. A sleeve pull-in shaft 46 is threaded on the end surface of the tool code exchanging shaft 42. As will be described later when the tool code exchanging shaft 42 is retracted at the time of tool exchange the enlarged head of sleeve pull-in shaft 46 engages the bottom of sleeve 27 to pull it in the housing 26. For the purpose of preventing the interference between sleeve 27 and sleeve pull-in shaft 46 when the tool pots 15 are rotated for the purpose of selecting a given tool 20, a notch 27a is formed on the inner surface of sleeve 27 near its outer end. A push member 47 is mounted on one end of tool code member exchanging shaft 42 through a bearing 48 for pushing sleeve 27 out of housing 26 as the shaft 42 is advanced. The push member 47 also acts to limit the longitudinal movement of tool code member 24A and is provided with a notch at its rear end for permitting the axial movement of tool code member 24B. The push member 47 is provided with a notch 49a adapted to receive a stop member 49 secured to the rear end of sleeve 27 for permitting free rotation of shaft 42 but preventing the rotation of push member 47. The piston rod of a piston cylinder assembly 51 mounted on the tool storage magazine 14 is connected to the other end of the tool code member exchanging shaft 42 through a coupling 50. Accordingly, as the piston cylinder assembly 51 is operated, the shaft 42 is reciprocated over a given stroke and electric signals representing the limits of the forward and rearward movements of the shaft 42 are generated by the cooperation of a dog 52 mounted on coupling 50 and a pair of limit switches 53 and 54 secured to the tool storage magazine 14. A cylindrical stop member 56 is slidably received in a sleeve 55 contained in a bracket 55a secured to the tool storage magazine 14. The stop member 56 is normally biased outwardly by means of a spring 57. When the tool code member exchanging shaft 42 is retracted to its rearward limit position for the purpose of pulling sleeve 27 into housing 26, coupling 50 is brought to engage stop member 56 to compress spring 57. At the rearward limit position the pressurized oil in the piston cylinder assembly 51 is drained so that shaft 42 is retracted by the action of spring 57 which acts upon shaft 42 via coupling 50 thereby forming a gap between sleeve pull-in shaft 46 and sleeve 27 thus permitting free rotation of the tool pot 15.

A gear 59 is mounted on splines 58 of the tool code member exchanging shaft 42, the gear 59 being supported by the tool storage magazine through a bearing 60. The gear 59 meshes with a gear 62 which is rotatably mounted on a tool exchanging arm driving mechanism 61 which is secured to the tool storage magazine. Further, gear 62 meshes with a gear 65 mounted on the splines 64 of the tool exchanging arm driving shaft 63. The gear 65 is rotatably supported by the driving mechanism 61 through a bearing 66. The gear ratio between gears 65 and 59 is 1:1 so that the tool code member exchanging shaft 42 is driven at the same speed as the tool exchanging arm driving shaft 63.

The tool exchanging arm 18 having gripping members for gripping tool 20 at its opposite ends is secured to the outer end of the tool exchanging arm driving shaft 63 which is rotatably supported by the tool exchanging arm driving mechanism 61, the opposite end of driving shaft 63 being connected through a coupling 67 to the piston rod of a piston cylinder assembly 68 which is secured to the tool storage magazine 14. Consequently, shaft 63 is reciprocated over a given stroke by the operation of the piston cylinder assembly 68 to move the tool exchanging arm 18 in the forward and rearward directions and electric signals are generated at the limits of the forward and rearward movements by the cooperation of a dog 69 mounted on coupling 67 and limit switches 70 and 71.

Figure 6:
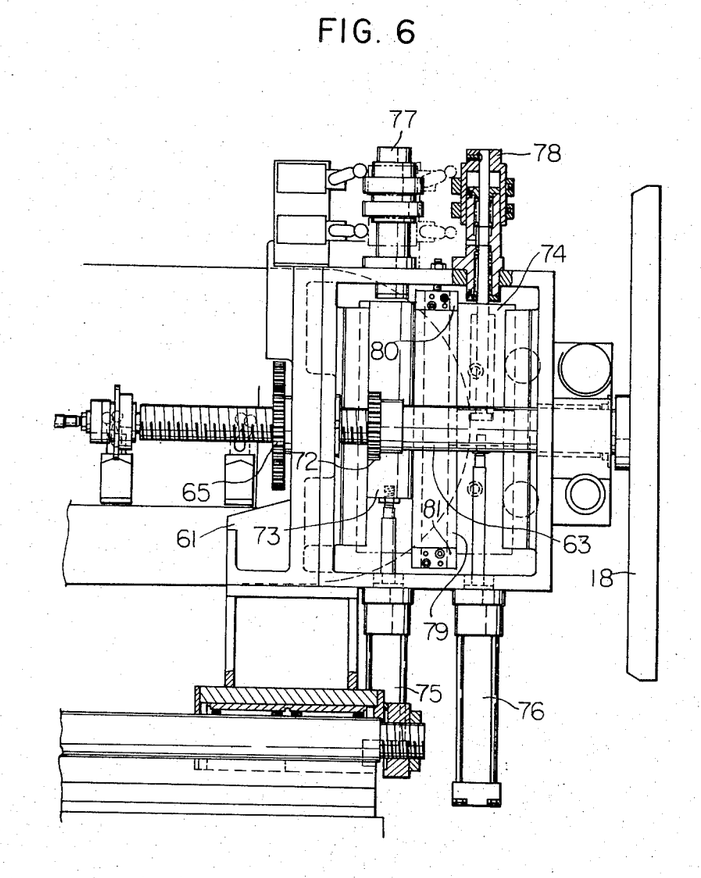
FIG. 6 shows a sectional view of the tool exchanging arm driving mechanism taken along a line VI–VI in FIG. 3.

Also a gear 72 is secured to the tool exchanging arm driving shaft 63 to mesh with racks 73 or 74 which are mounted on the driving mechanism 61 to be slidable in a direction perpendicular to the sheet of FIG. 4. At the retracted position of shaft 63, gear 72 engages rack 73 whereas at the forward position gear 72 engages rack 74. As shown in FIG. 6, one ends of racks 73 and 74 are connected with the piston rods of piston cylinder assemblies 75 and 76, respectively and devices 77 and 78 for affirming the limits of upward and downward movements of the racks 73 and 74 are mounted on the upper ends thereof. Stop members 80 and 81 are mounted on the opposite ends of a stationary rack 79 which acts as a guide for racks 73 and 74 for limiting the upward and downward movements of rack 73 and 74.

Exchange of the tools is effected in the following manner. During the operation of the machine tool which is equipped with tool 20A on its spindle 12, in the tool storage magazine 14 tool 20B to be used next time is designated and the endless chain constituted by a number of tool pots 15 is driven by the driving mechanism 22 for indexing a given tool pot 15 containing tool 20B to the tool exchanging position. The code detector 100 mounted on the tool storage magazine 14 reads the codes of tool code members 24 of tool pots 15 passing before it thereby identifying a particular tool pot 15 equipped with tool code member 24B corresponding to tool 20B. When the code detector detects and identifies tool code member 24B the operation of the driving mechanism 22 is stopped to index the particular tool pot 15 to the tool exchanging position and the pot 15 is positioned by the positioning device 25.

When the cutting operation of tool 20A is completed and a tool exchanging command signal is given, the tool storage magazine 14 is moved along guide 17 by the operation of the piston cylinder assembly 16 to the advanced position where the tools are exchanged. At the same time, the spindle head 11 of the machine tool is brought to the tool exchanging position. Then, nose nut 35 is rotated by the nose nut rotating device 37 to disengage pawls 36 of the nose nut 35 from groove 34 of the tool 20B. Then, the piston cylinder assembly 51 of the tool storage magazine 14 is operated to advance the tool code member exchanging shaft 42, thus urging the push member 47 against the end surface of sleeve 27. As the shaft 42 is advanced further the sleeve 27 is pushed out of housing 26 and when groove 34 of tool 20B is brought into alignment with the groove 34 of tool 20A mounted on spindle 12 and the gripping member of the tool exchanging arm 18, stop member 49 secured to sleeve 27 will come into engagement with the end surface of housing 26 to stop the forward movement of the tool code member exchanging shaft 42, at which time dog 52 cooperates with limit switch 53 to generate an electrical signal representing the limit of the forward movement of shaft 42. At this time, the dovetail groove 38 of sleeve 27 accomodating tool code member 24B corresponding to tool 20B is in axial alignment or at the same angular position with vacant dovetail groove 43 of the tool code member exchanging shaft 42. Since the forward movement of tool code 24B is prevented by stop member 39 as the shaft 42 is advanced, tool code member 24B will be transferred into vacant dovetail groove 43 of shaft 42 from dovetail groove 38 of sleeve 27. More particularly, in the advanced position, the dovetail grooves of the tool code member exchanging shaft 42 contain tool code 24A corresponding to tool 20A mounted on the spindle 12 and tool code member 24B which has been contained in tool pot 15 for the newly selected tool 20B.

When the piston cylinder assembly 75 is operated for the purpose of rotating the tool exchanging arm 18 which has been held in the retracted neutral position, due to the engagement of rack 73 and gear 72 the tool exchanging arm driving shaft 63 is rotated as the rack 73 is moved until it is stopped by stop member 81 for limiting the downward movement. Since the amount of movement of rack 73 corresponds to a 90° rotation of shaft 63, the tool exchanging arm 18 will be rotated 90° from the neutral position. At this time, confirming device 77 mounted on the upper end of rack 73 generates an electric signal representing the 90° rotation of the tool exchanging arm 18. When the tool exchanging arm 18 has been rotated 90°, it will simultaneously grip tool 20A mounted on spindle 12 and tool 20B contained in a tool pot 15 of the tool storage magazine 14. When piston cylinder assembly 68 is operated to advance the tool exchanging arm 63, the tool exchanging arm 18 which is now holding both tools 20A and 20B is also advanced so as to remove tool 20A from spindle 12 and tool 20B from tool pot 15. The limit of the forward movement of the tool exchanging arm 18 is confirmed by the cooperation of dog 69 and limit switch 70. At the advanced position of the tool exchanging arm 63, the gear 72 meshes with rack 74 so that when the piston cylinder assembly 76 is operated the rack 74 will be lowered until it is stopped by stop means 81 whereby shaft 63 is rotated. Since the amount of movement of rack 74 corresponds to a 180° rotation of shaft 63 the tool exchanging arm 18 is also rotated 180°. This 180° rotation of the tool exchanging arm 18 is confirmed by confirming device 78 at the upper end of rack 74. Under these conditions tool 20A is brought to confront tool pot 15 and tool 20B to confront the spindle 12.

Then the piston cylinder assembly 68 is operated in the opposite direction to retract shaft 63 until stop means 82 engages the side surface of gear 65 whereby the tool 20A held by tool exchanging arm 18 is inserted into tool pot 15 and tool 20B is mounted on spindle 12. The limit of the rearward movement of shaft 63 is detected by the cooperation of dog 69 and limit switch 71. Then, the piston cylinder assembly 75 is operated in the direction opposite to that of the previous operation in which the tool exchanging arm 18 was rotated 90° until rack 73 is stopped by stop member 80 which limits the upward movement thereof whereby the tool exchanging arm 18 is rotated 90° in the opposite direction to resume the neutral position. This 90° rotation of the tool exchanging arm 18 is confirmed by confirming device 77 at the upper end of rack 73. However, it will be noted that the tool exchanging arm 18 has been rotated 180° from its original position. Further, as the piston cylinder assembly 76 has been held in the operated position, this assembly is now operated to resume its original position to move upwardly rack 74 upwardly until it is stopped by stop means 80 which functions to limit the upward movement. Restoration of the original position of rack 74 is confirmed by confirming device 78. However, as the shaft 63 is at the limit of the rearward movement the gear 72 is disengaged from rack 74 so that the rack 74 can return freely to its original position.

By the operation described above tool 20A on spindle 12 which was used previously is now returned to a tool pot 15 and the newly selected tool 20B in another tool pot 15 is mounted on spindle 12 thus completing the desired tool exchanging operation.

Because the tool code exchanging shaft 42 is driven by the tool exchanging arm driving shaft 63 through gears 65, 62, and 59, shaft 42 is rotated 180° from the original position to the position at which the tool exchange has been performed. Consequently, the tool code member 24A corresponding to tool 20A which has been mounted on spindle 12 before tool exchange will be brought to confront the vacant dovetail groove of the sleeve 27 of tool pot 15 whereas tool code member 24B will be brought to the opposite side. When th piston cylinder assembly 51 is operated to retract tool code member exchanging shaft 42, th enlarged head of sleeve pull-in shaft 46 which is threaded to shaft 42 will engage the bottom of sleeve 27 to pull it into housing 26 as shaft 42 is retracted. The rearward movement of shaft 42 is continued until a shoulder 83 of sleeve 27 engages a stop 84 secured to housing 26. The limit of this rearward movement is detected by the cooperation of dog 52 and limit switch 54. A little before reaching this limit, coupling 50 engages stop means 56 and thereafter it is moved rearwardly against spring 57. For this reason, when the pressurized oil in piston cylinder assembly 51 is exhausted the force of spring 57 will advance shaft 42 until the shoulder of stop means 56 engages stationary sleeve 55. This means that the enlarged head of sleeve pull-in shaft 46 has been disengaged from the bottom 27 of sleeve 27.

When sleeve 27 is pulled into housing 26 by the rearward motion of the tool code member exchanging shaft 42, as the tool code member 24A which has been contained in shaft 42 is prevented from being moved in the axial direction by stop means 85 mounted on the tool storage magazine, the tool code member 24A will be transferred into vacant dovetail groove 38 of sleeve 27. Accordingly, when tool 20B originally contained in sleeve 27 is replaced by tool 20A which has been mounted on spindle 12, the tool code member 24A will be replaced by tool code member 24B. Tool code member 24A which has been mounted on tool code member exchanging shaft 42 is now transferred to sleeve 27 whereas tool code member 24B of tool 20B which is then to be mounted on spindle 12 is transferred to the tool code member exchanging shaft 42 from sleeve 27.

As sleeve 27 which is now containing previously used tool 20A is pulled into housing 26 of another tool pot, nose nut 35 is rotated by nose nut rotating device 37 to cause the pawls 36 of nose nut 35 to engage groove 34 of tool 20A thereby clamping it to housing 26 for preventing drop out of the tool.

When the tool code member exchanging shaft 42 is returned to the limit of the rearward movement and tool 20A is clamped to tool pot 15, the tool exchanging operation is completed. Then the tool storage magazine 14 is retracted to the waiting position by the operation of piston cylinder assembly 16 so as not to interfere with the operation of the machine tool and the machine tool equipped with the newly selected tool 20B can initiate its cutting operation.

Having now completed the entire tool exchanging operation, it is possible to repeat subsequent cycles by providing tool exchanging command signals.

Although in the above described embodiment the tool storage magazine was shown as comprising a plurality of tool pots which are interconnected into an endless chain any other type of the tool storage magazine can also be used, for example of the rotary disc type wherein tools are contained in tool pots with their axes oriented in parallel with the axis of the spindle of the machine tool and the tool pots are selectively indexed to the tool exchanging position.

As above described, according to this invention tools and tool code members are prepared independently and tool code members corresponding to the tools received in respective tool pots are applied thereto so that it is possible to use tools of the standard type of simple construction. Moreover, as it is possible to select tools at random, the tool exchange operation can be simplified and can be made quickly. Further, it is not necessary to store return addresses in the control system as in the conventional pot coding system thereby simplifying the sequence control. Because the tool member is designated by combining tool code members and tools it is not necessary to form particular tool codes on the tools themselves as in the conventional tool coding system so that it is possible to readily change the tool codes. According to this invention, since the tool code members are automatically exchanged by mechanical means interlocked with the operation of the tool exchanging arm it is possible not only to simplify the sequence control but also assure correct relationship between the tool exchanging arm and the tool code members.

I claim:

1. In an automatic tool exchanging apparatus for use in combination with a machine tool of the class having a tool carrying spindle for performing machining operations a plurality of key shaped tool code members, each tool code member formed with a tool code corresponding to a given tool, a tool storage magazine including a plurality of tool pots, each adapted to removably receive one tool and one tool code member, means to read the code of a tool code member in a given tool pot and operatively positioned for indexing said tool storage magazine to a tool exchanging position in accordance with the code of a tool code member in a given tool pot, and a tool exchanging arm positioned on said machine and adapted to exchange a tool mounted on the spindle of said machine tool and a tool in said given tool pot at said tool exchanging position, the improvement wherein each of said tool pots includes a cylindrical housing and a sleeve positioned within said cylindrical housing so as to be movable in the axial direction with respect to said cylindrical housing, said sleeve having an opening adapted to receive the shank of a tool and an axial groove on its outer surface for receiving therein a tool code member, tool code member exchanging means positioned coaxial with said sleeve and having two diametrically opposite tool code member receiving groove, means for rotating said tool code member exchanging means connected thereto about said housing cylinder axis for bringing a selected one of the tool code receiving grooves into axial alignment with the groove of said sleeve, means connected to said tool code member exchanging means for reciprocating said tool code member exchanging means toward and away from said given tool pot for exchanging tool code members therebetween, and means operatively positioned for interlocking said tool code member exchanging means with said tool exchanging arm for replacing said tool code member corresponding to the tool in said given tool pot for said tool code member corresponding to said tool on said spindle.

2. In an automatic tool exchanging apparatus for use in combination with a machine tool of the class having a tool carrying spindle for performing machining operations, a plurality of key shaped tool code members, each tool code member formed with a tool code corresponding to a given tool, a tool storage magazine including a plurality of tool pots, each adapted to removably receive one tool and one tool code member, means to read the code of a tool code member in a given tool pot and operatively positioned for indexing said tool storage magazine to a tool exchanging position in accordance with the code of a tool code member in a given tool pot, and a tool exchanging arm positioned on said machine and adapted to exchange a tool mounted on the spindle of said machine tool and a tool in said given tool pot at said tool exchanging position, the improvement wherein each of said tool pots includes a cylindrical housing and a sleeve positioned within said cylindrical housing so as to be movable in the axial direction with respect to said cylindrical housing, said sleeve having an opening adapted to receive the shank of a tool and an axial groove on its outer surface for receiving therein a tool code member, tool code member exchanging means positioned coaxial with said sleeve and having two diametrically opposite tool code member receiving grooves, said tool code member exchanging means comprised of a sleeve pull-in member at one end which pulls said sleeve into said housing when said tool code member exchanging means is moved away from said tool exchanging position, and a push member for pushing said sleeve out of said cylinder when said tool code member exchanging means is moved in the opposite direction, means for rotating said tool code member exchanging means connected thereto for bringing a selected one of the tool code receiving grooves into axial alignment with the groove of said sleeve, means connected to said tool code member exchanging means for reciprocating said tool code member exchanging means toward and away from said given tool pot for exchanging tool code members therebetween, and means operatively positioned for interlocking said tool code member exchanging means with said tool exchanging arm for replacing said tool code member corresponding to the tool in said given tool pot for said tool code member corresponding to said tool on said spindle.--.

3. The automatic tool exchanging apparatus according to claim 2 wherein said push member is mounted on said code member exchanging means to be free to rotate, and said push member and said sleeve are provided with means which are caused to engage each other when said code member exchanging means is advanced toward said sleeve for preventing said push member from rotating relative to said code member exchanging means.

* * * * *